United States Patent
Huang et al.

(10) Patent No.: US 8,909,812 B2
(45) Date of Patent: Dec. 9, 2014

(54) METHOD AND DEVICE FOR COMMUNICATION FOR HOST DEVICE WITH IPV4 APPLICATION

(75) Inventors: Bill Huang, Beijing (CN); Gang Chen, Beijing (CN); Hui Deng, Beijing (CN); Bing Wei, Beijing (CN); Xiaoyun Wang, Beijing (CN)

(73) Assignee: China Mobile Group Beijing Co., Ltd., Xicheng District, Beijing (CN)

( * ) Notice: Subject to any disclaimer, the term of this patent is extended or adjusted under 35 U.S.C. 154(b) by 427 days.

(21) Appl. No.: 13/375,969

(22) PCT Filed: Jun. 3, 2010

(86) PCT No.: PCT/CN2010/000793
§ 371 (c)(1),
(2), (4) Date: Jan. 12, 2012

(87) PCT Pub. No.: WO2010/139194
PCT Pub. Date: Dec. 9, 2010

(65) Prior Publication Data
US 2012/0110210 A1    May 3, 2012

(30) Foreign Application Priority Data

Jun. 3, 2009    (CN) .......................... 2009 1 0085886
Jun. 3, 2009    (CN) .......................... 2009 1 0085887
Jun. 26, 2009   (CN) .......................... 2009 1 0088351

(51) Int. Cl.
*G06F 15/16*    (2006.01)
*H04L 29/12*    (2006.01)
*H04L 29/06*    (2006.01)

(52) U.S. Cl.
CPC ........ *H04L 29/12358* (2013.01); *H04L 61/251* (2013.01); *H04L 69/167* (2013.01); *H04L 61/6086* (2013.01); *H04L 61/2525* (2013.01); *H04L 29/12396* (2013.01); *H04L 29/12971* (2013.01)
USPC ....................................................... 709/246

(58) Field of Classification Search
CPC ..................... H04L 12/4633; H04L 29/12443; H04L 29/12537; H04L 29/12971; H04L 45/741; H04L 61/2525; H04L 61/251; H04L 61/6059; H04L 61/6086; H04L 69/167
USPC .................................. 709/201–203, 246–248
See application file for complete search history.

(56) References Cited

U.S. PATENT DOCUMENTS

| 8,417,831 B2 * | 4/2013 | Ge et al. ........................ 709/236 |
| 2004/0088385 A1 | 5/2004 | Blanchet et al. |

(Continued)

FOREIGN PATENT DOCUMENTS

| CN | 1578296 | 2/2005 |
| CN | 1716954 | 1/2006 |
| EP | 1505792 | 2/2005 |

OTHER PUBLICATIONS

PCT/CN2010/000793, Sep. 9, 2010, International Search Report.

*Primary Examiner* — Chirag R Patel
(74) *Attorney, Agent, or Firm* — Workman Nydegger

(57) ABSTRACT

Provided are a method and a device of a host with IPv4 application for performing communication. The method of the host with IPv4 application for performing data communication includes the following steps: the IPv4 application generates an IPv4 packet sent to a communication end; when confirming the type of the network the host is located in is an IPv6 network, the host transforms the IPv4 packet head of the IPv4 packet to an IPv6 packet header, and sends it to the communication end via the IPv6 network. With this invention, it can be accomplished that according to the type of the network the host is located in, the host with IPv4 application communicates with a communication end; the processing load of the system is lightened; the probability that invalidation occurs at a single node is reduced; the smooth migration and transition from original IPv4 application to IPv6 system are facilitated.

17 Claims, 8 Drawing Sheets

(56) References Cited

U.S. PATENT DOCUMENTS

| | | | |
|---|---|---|---|
| 2004/0093434 A1* | 5/2004 | Hovell et al. | 709/249 |
| 2004/0162909 A1* | 8/2004 | Choe et al. | 709/230 |
| 2006/0215657 A1* | 9/2006 | Lee et al. | 370/389 |
| 2006/0259639 A1* | 11/2006 | Aken et al. | 709/245 |

* cited by examiner

METHOD AND DEVICE FOR COMMUNICATION FOR HOST DEVICE WITH IPV4 APPLICATION

CROSS REFERENCE TO RELATED APPLICATIONS

The present application is a US National Stage of International Application No. PCT/CN2010/000793, filed 3 Jun. 2010, designating the United States, and claiming priorities to Chinese Patent Application No. 200910085887.8 filed 3 Jun. 2009, Chinese Patent Application No. 200910085886.3 filed 3 Jun. 2009, and Chinese Patent Application No. 200910088351.1 filed 26 Jun. 2009.

FIELD OF THE INVENTION

The present invention relates to the field of mobile communications, and in particular, to a technology for communication for a host device with an IPv4 application.

BACKGROUND OF THE INVENTION

As the addresses of Internet Protocol version 4 (IPv4) are exhausted and a service requires a terminal be "always online", it will be certain that Internet Protocol version 6 (IPv6) technology is deployed. In order to introduce the concept of IPv6 network step by step, the construction of IPv6 network and IPv4/IPv6 dual stack network will be the first step for deploying IPv6 technology. However, the current host devices have a great amount of IPv4 applications but only a very little amount of IPv6 applications, thus it will become an important problem to be solved in the initial stages of the transition scheme of IPv6 that how IPv4 applications are accessed and intercommunicated between host devices in an IPv6 network.

In the prior art, SIIT algorithm provides a method for an IPv6 application to communicate with an IPv4 node via an IPv6 network and an IPv4 network. In this method, an SIIT translator is set on the network topology path on which a data packet passes in and out of the IPv6 network; when a large amount of data streams that access to external IPv4 applications appear in the network, the SILT translator needs to translate each data stream and save the state thereof, which makes the processing load of the network system very heavy and is easy to cause a Single Point of Failure in the system. Moreover, SILT algorithm does not provide a method for an IPv4 application to communicate with an IPv4 node via an IPv6 network.

Furthermore, an BIS algorithm of the prior art provides a method for an IPv4 application to access to an IPv6 node in an IPv6 network. In this method, a translation module is added to a host device with the IPv4 application, for monitoring data streams between a TCP/IP module and a network card driver and mutually translating between the IPv4 and IPv6 data packets. When a host device with an IPv4 application communicates with other IPv6 host devices, some IPv4 addresses are allocated in the host device to the corresponding IPv6 host devices, and these addresses are only used inside this host device. Moreover, such an allocation process is accomplished via a DNS protocol automatically. Thus, the host device with the IPv4 application may convert a data packet to be sent to the opposite end IPv6 node into an IPv6 data packet through the translation module, or it may convert a received IPv6 data packet into an IPv4 data packet and transfer the IPv4 data packet to the IPv4 application, thereby realizing the communication with the IPv6 node in the IPv6 network. However, in a scene of practical application, it is possible that an IPv4 application needs to access to another IPv4 application via an IPv6 network, then the BIS algorithm has no solution for such a scene.

In another scheme of the prior art, it is put forward that a border conversion gateway device is deployed on the edge of IPv4 and IPv6 networks, where the border conversion gateway device converts a data packet sent to the IPv4 network from the IPv6 network into an IPv4 data packet, and converts a data packet sent to the IPv6 network from the IPv4 network into an IPv6 data packet. Thus, by combining this scheme with the above BIS algorithm, the problem that an IPv4 application accesses to another IPv4 application via an IPv6 network may be solved. However, because a dedicated border conversion gateway device needs to be deployed on the edge of IPv4 and IPv6 networks to realize the conversion of data packets, the processing load of the network system will be made very heavy, and it will be easy to cause the problem of Single Point of Failure. Moreover, although an IPv4 application can access to an IPv4 node in an IPv4 network via an IPv6 network by employing this technical solution, this solution is only limited to a scene in which the opposite end is an IPv4 node (or a host device with an IPv4 application); that is, when the IPv4 application communicates, it takes for granted that the opposite end is an IPv4 node or a host device with an IPv4 application, if the opposite end is an IPv6 node, communication will be unable to be carried out or a communicate error will occur, which greatly limits the flexibility of communication via an IPv6 network for an IPv4 application.

In conclusion, all the prior art methods for an IPv4 application to access to another IPv4 application via an IPv6 network need to deploy a dedicated device (for example, the above SIIT translator or border conversion gateway device) on the edge of IPv4 and IPv6 networks for address translating and serving an application information conversion function of the application layer gateway (ALG) (i.e., application layer gateway function). Especially, it has been proved by practice that the addition of the application layer gateway function will bring a heavy processing load to the network system, which makes it easy to cause the problem of Single Point of Failure.

SUMMARY OF THE INVENTION

The embodiments of the invention provides a method and a device for data communication for a host device with an IPv4 application, where by modifying the internal structure of the host device, the IPv4 application may access to a communication opposite end via an IPv6 network, and the flexibility of data communication of the IPv4 application via an IPv6 network may be improved.

The embodiments of the invention provides a method and a device for a host device with an IPv4 application to obtain an IPv4 address of a communication opposite end, where by modifying the internal structure of the host device, the processing load of the network system may be reduced when the IPv4 application accesses to the communication opposite end via an IPv6 network.

One embodiment of the invention provides a method for data communication for a host device with an IPv4 application, including:

generating, by the IPv4 application, an IPv4 data packet to be sent to a communication opposite end; and converting, by the host device, when determining that the type of a network the host device lies in is an IPv6 network, an IPv4 packet header of the IPv4 data packet into an IPv6 packet header, and sending the converted data packet to the communication opposite end via the IPv6 network.

One embodiment of the invention further provides a method for data communication for a host device with an IPv4 application, including:

invoking, by the IPv4 application, an IPv4 Socket API function to initiate an application data request to a communication opposite end; and converting, by the host device, the invoking of the IPv4 Socket API function into the invoking of an IPv6 Socket API function when determining that the type of a network the host device lies in is an IPv6 network, generating an IPv6 data packet, and sending the IPv6 data packet to the communication opposite end via the IPv6 network.

One embodiment of the invention provides a host device with an IPv4 application, including:

an IPv4 application module, configured to execute an IPv4 application;

a dynamic loading module, configured to judge the type of a network in which the host device lies, and load a packet header translation module when judging that the type of the network in which the host device lies is an IPv6 network;

the packet header translation module, configured to convert an IPv4 packet header of an IPv4 data packet, generated by the IPv4 application and to be sent to a communication opposite end, into an IPv6 packet header; and an interface module, configured to send the data packet converted by the packet header translation module via the IPv6 network.

One embodiment of the invention further provides a host device with an IPv4 application, including:

an IPv4 application module, configured to execute an IPv4 application;

a dynamic loading module, configured to judge the type of a network in which the host device lies, and load a Socket translation module when judging that the type of the network in which the host device lies is an IPv6 network;

a Socket translation module, configured to convert the invoking of an IPv4 Socket API function into the invoking of an IPv6 Socket API function when the IPv4 application module executes the IPv4 application and invokes the IPv4 Socket API function to initiate an application data request to a communication opposite end, and generating an IPv6 data packet; and an interface module, configured to send the IPv6 data packet generated by the Socket translation module via the IPv6 network.

One embodiment of the invention provides a method for a host device with an IPv4 application to obtain an IPv4 address of a communication opposite end via an IPv6 network, including:

generating, by the IPv4 application, an IPv4 DNS request data packet according to an IPv4 address and a DNS address obtained;

converting, by the host device, an IPv4 packet header in the IPv4 DNS request data packet into an IPv6 packet header, generating a DNS request data packet carried by IPv6, and sending the DNS request data packet carried by IPv6 to a DNS server corresponding to the DNS address via the IPv6 network; and receiving, by the IPv4 application, a DNS response message data packet returned by the DNS server, and obtaining the IPv4 address of the IPv4 communication opposite end to be communicated with.

One embodiment of the invention further provides a method for a host device with an IPv4 application to obtain an IPv4 address of a communication opposite end via an IPv6 network, including:

generating, by the IPv4 application, an IPv4 DNS request data packet according to an IPv4 address and a DNS IPv4 address obtained; converting, by the host device, an IPv4 packet header in the IPv4 DNS request data packet into an IPv6 packet header, generating a DNS request data packet carried by IPv6, and sending the DNS request data packet carried by IPv6 to a DNS server corresponding to the DNS IPv4 address via the IPv6 network; or invoking, by the IPv4 application, an IPv4 Socket API function to initiate a DNS request according to an IPv4 address and a DNS IPv6 address obtained; converting, by the host device, the invoking of the IPv4 Socket API function into the invoking of an IPv6 Socket API function, generating a DNS request data packet carried by IPv6, and sending the DNS request data packet carried by IPv6 to a DNS server corresponding to the DNS IPv6 address via the IPv6 network;

receiving, by the IPv4 application, a DNS response message data packet returned by the DNS server, and obtaining the IPv4 address of the IPv4 communication opposite end to be communicated with.

One embodiment of the invention provides a host device with an IPv4 application, including:

an IPv4 application module, configured to execute an IPv4 application;

a packet header translation module, configured to convert an IPv4 packet header in an IPv4 data packet sent by the IPv4 application module into an IPv6 packet header; and an address translation module, configured to provide a mapping between an IPv4 address and an IPv6 address.

One embodiment of the invention further provides a host device with an IPv4 application, including:

an IPv4 application module, configured to execute an IPv4 application;

a DNS judging and processing module, configured to judge whether a received DNS response conveys an IPv4 record (i.e. A record) or an IPv6 record (i.e. AAAA record); when it is an IPv4 record, a packet header translation module is started; and when it is an IPv6 record, a Socket translation module is started;

the packet header translation module, configured to convert an IPv4 packet header in a related IPv4 data packet sent by the IPv4 application module into an IPv6 packet header;

a Socket translation module, configured to convert the invoking of an IPv4 Socket API function into the invoking of an IPv6 Socket API function when the IPv4 application module executes an IPv4-related application to invoke the IPv4 Socket API function; and an address translation module, configured to provide a mapping between an IPv4 address and an IPv6 address.

In the embodiments of the invention, because a host device with an IPv4 application can convert an IPv4 packet header of an IPv4 data packet into an IPv6 packet header, the data packet may be transmitted via an IPv6 network; moreover, no conversion of the transmission layer and the data part is concerned, thus the processing load of the system may be reduced greatly; the IPv4 application can communicate with not only an IPv6 application, but also an IPv4 application via the IPv6 network, so that the flexibility of communication via an IPv6 network for an IPv4 application may be improved.

Furthermore, because a set NAT device can convert the IPv6 packet header of the data packet into the IPv4 packet header, an intact IPv4 data packet may be formed, so that it may be sent to an IPv4 node or a host device with an IPv4 application. Moreover, the NAT device only converts the packet header part of the data packet and no conversion of the transmission layer and the data part is concerned, thus the processing load of the system may be reduced greatly, and the probability that a Single Point of Failure occurs may be lowered.

DETAILED DESCRIPTION OF THE EMBODIMENTS

The method and the device for communication for a host device with an IPv4 application according to the embodiments of the invention will be illustrated in detail below by specific embodiments in conjunction with the drawings.

Figure 1:
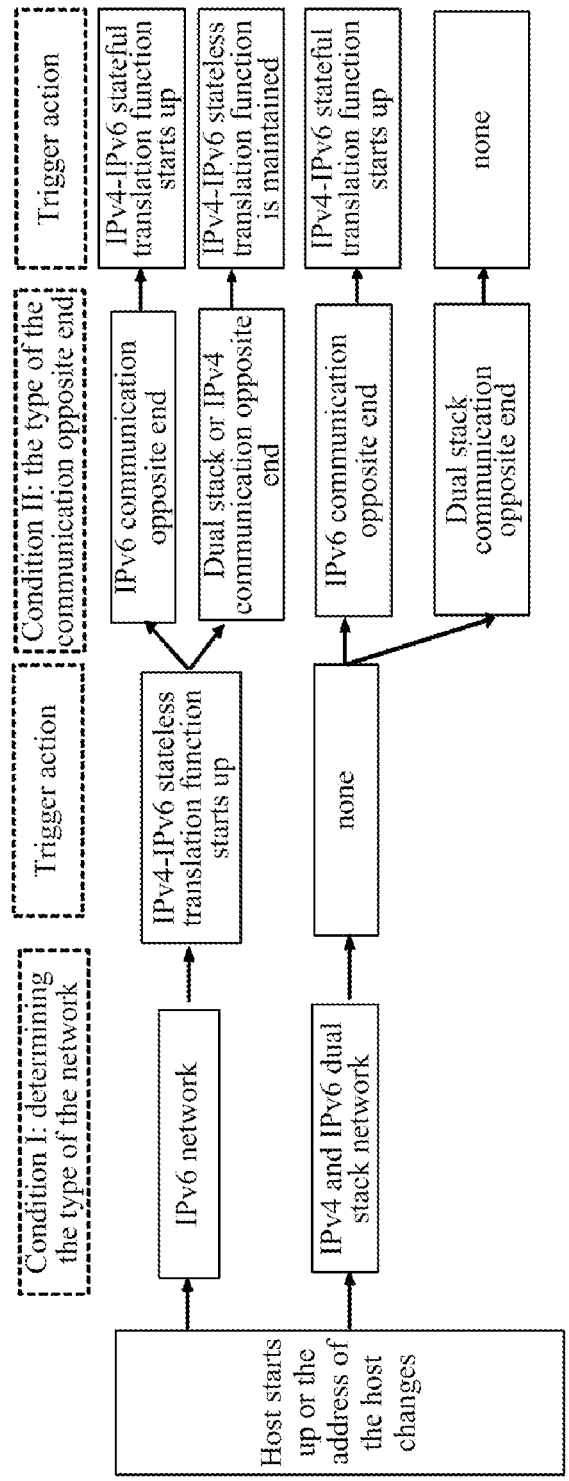
FIG. 1 is a diagram showing a dynamic loading logic of a translation function according to one embodiment of the invention.

In the transition stages from IPv4 to IPv6, a situation in which IPv4, IPv6 and dual stack technologies coexist will appear for a considerably long time. The implementation of such three technologies on terminals, networks and service platforms determines that different application scenes will appear in the network. Various service scenes, which are caused by different deployment environments, the change of service implementation modes, and different technology combinations of host device application type, host device protocol stack type, network type and service platform type, are possible to appear in the transition stages from IPv4 to IPv6. In order to implement different host device translation functions in specific application scenes, in the embodiments of the invention, a dynamic loading mechanism of translation function is put forward on the host device, the dynamic loading logic of which is as shown in FIG. 1. When the IPv4-IPv6 translation function of the host device is started, IPv6 applications will not be effected, and the translation function will only process data and call requests initiated by an IPv4 application. After the translation function of the host device is initialized, a dynamic loading logic will learn a type of the current network via a network type judging function. When the host device lies in an IPv6 network, a judging logic starts an IPv4-IPv6 stateless translation function through a host device translation loading module, the start of the function may guarantee that data packets sent from all the IPv4 applications on the host device can be translated via the host device translation module, so that the data packets may be transferred over the IPv6 network. Because this function will not effect IPv6 applications, the IPv6 applications on the host device will develop a service in a normal communication mode. When the host device lies in an IPv6 network, under the situation that the type of the communication opposite end is an IPv6 communication opposite end, a logic judging function will start an IPv4-IPv6 stateful translation function via the host device translation loading function, i.e., the host device will establish an IPv4-IPv6 mapping state information locally, thereby realizing the mapping of an IPv6 address of the communication opposite end to an IPv4 address in the host device, so as to be identified by the IPv4 application. Under the situation that the type of the communication opposite end is an IPv4 or dual stack communication opposite end, the host device translation function will keep the IPv4-IPv6 stateless translation. When the host device lies in an IPv4-IPv6 dual stack network, according to the type of DNS response, when the type of the communication opposite end is an IPv6 communication opposite end, the host device will start the IPv4-IPv6 stateful translation function, so that an IPv4 application on the host device under this environment can obtain a capability of communicating with the IPv6 communication opposite end.

During a specific implementation, the type of the communication opposite end (i.e., address type) may be determined according to the type of the DNS response information related to the current application session. The type of the DNS response information reflects the service type, and also reflects the type of the communication opposite end and the type of the data packet processed by the communication opposite end. Generally, in the DNS response information that belongs to an IPv4 service, the type identification is A, and it is referred to as A-type DNS response information. A-type DNS response information indicates that the address of the communication opposite end is an IPv4 address and the data packet processed by the communication opposite end is an IPv4 data packet. However, for the DNS response information that belongs to an IPv6 service, the type identification is AAAA, and it is referred to as AAAA-type DNS response information. AAAA-type DNS response information indicates that the address of the communication opposite end is an IPv6 address and the data packet processed by the communication opposite end is an IPv6 data packet.

When a host device with an IPv4 application communicates with a communication opposite end via an IPv6 network, delivery via the IPv6 network after converting an IPv4 packet header of an IPv4 data packet into an IPv6 packet header is concerned. Therefore, the embodiments of the invention provides a method for converting an IPv4 packet header of an IPv4 data packet into an IPv6 packet header, the method includes the following process.

The host device combines an IPv4 source address in the IPv4 data packet with an IPv6 prefix allocated to the host device to generate an IPv6 source address in the IPv6 packet header of a converted IPv6 data packet; and combines an IPv4 destination address in the IPv4 data packet with a set well-known prefix (WKP) to generate an IPv6 destination address in the IPv6 packet header of the converted IPv6 data packet.

The above conversion method according to the embodiments of the invention will be illustrated in conjunction with specific flows.

Figure 2:
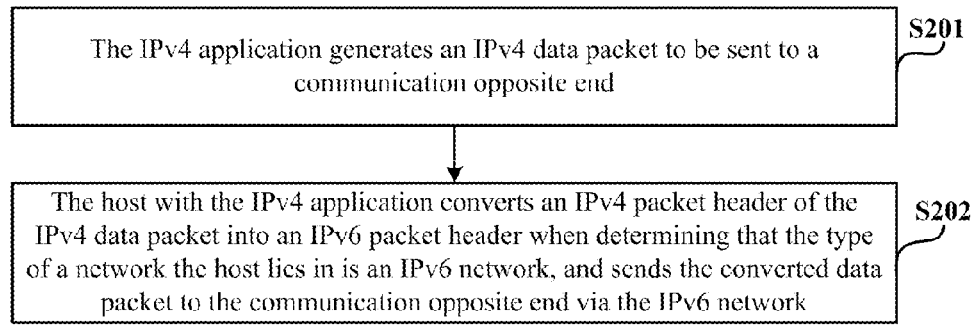
FIG. 2 is a flow chart of a method for data communication for a host device with an IPv4 application according to one embodiment of the invention.

As shown in FIG. 2, one embodiment of the invention provides a method for data communication for a host device with an IPv4 application, the method includes the following steps.

S201: The IPv4 application generates an IPv4 data packet to be sent to a communication opposite end.

S202: The host device with the IPv4 application converts an IPv4 packet header of the IPv4 data packet into an IPv6 packet header when determining that the type of a network the host device lies in is an IPv6 network, and sends the converted data packet to the communication opposite end via the IPv6 network.

In order to transmit the generated data packet in the IPv6 network, the host device converts the IPv4 packet header of the generated IPv4 data packet into the IPv6 packet header. Specifically, the host device converts the format of the packet header of the generated IPv4 data packet into the format of the packet header of the IPv6 data packet, and converts the IPv4 addresses of the host device and the communication opposite end in the packet header into IPv6 addresses, but the transmission layer and data part of the data packet are not converted. The protocol in the IPv4 packet header is converted into Next header in the IPv6 packet header, and TOS in the IPv4 packet header is converted into Traffic class and Flow Label in the IPv6 packet header; Total length in the IPv4 packet header is converted into payload length in the IPv6 packet header; TTL in the IPv4 packet header is converted into Hop limit in the IPv6 packet header; version in the IPv4 packet header is converted into version in the IPv6 packet header, where the conversion of packet header format refers to converting the content of each field in the IPv4 packet header into the corresponding field of the IPv6 packet header.

The specific method of address conversion is as follows: the conversion from an IPv4 address into an IPv6 address employs a stateless address translation mode, thereby realizing the packaging of a data packet sent by the host device to the IPv6 network. Specifically, a 96-bit IPv6 prefix is added to the front of the IPv4 address to form an IPv6 address. The IPv6 prefix belongs to well-known prefix, which may be specified by the network operator. The IPv4 addresses of the host device and the communication opposite end in the packet header are converted into the corresponding IPv6 addresses according to a corresponding relationship table.

During a specific implementation, the step of sending the converted data packet to the communication opposite end via the IPv6 network includes:

the host device sends the converted data packet to an NAT device via the IPv6 network when determining that the type of the communication opposite end is an IPv4 communication opposite end; and the NAT device converts the IPv6 packet header of the received data packet into an IPv4 packet header, and forwards the data packet to the IPv4 communication opposite end.

The NAT device does not need to convert the whole data packet, no conversion of the transmission layer and data part of the data packet is concerned, and the IPv4 data packet may be obtained by only converting the packet header part, thus the IPv4 data packet is forwarded. Thus, in comparison with a prior art device set on the border of the IPv6 and IPv4 networks, the parsing and converting works on a data packet may be greatly reduced, and the processing load on the system may be lowered, so that Single Point of Failure may be avoided as best as possible.

If the type of the communication opposite end is an IPv4 communication opposite end, after the IPv4 communication opposite end receives the data packet forwarded by the NAT device, the method further includes:

the IPv4 communication opposite end sends an IPv4 data packet returned to the host device to the NAT device;

the NAT device converts an IPv4 packet header of the IPv4 data packet into an IPv6 packet header, and delivering the data packet to the host device via the IPv6 network; and the host device returns the received data packet to the IPv4 application.

During a specific implementation, a mapping table of the corresponding relationship between IPv4 addresses and IPv6 addresses is also maintained in the host device, and before the IPv4 application generates the IPv4 data packet to be sent to the communication opposite end, the method further includes:

the host device maps an IPv6 address of an IPv6 communication opposite end into an IPv4 address as an IPv4 destination address in the IPv4 packet header of the IPv4 data packet, according to the stored mapping table of the corresponding relationship between IPv4 addresses and IPv6 addresses, when determining that the type of the communication opposite end is the IPv6 communication opposite end.

During a specific implementation, when the host device with an IPv4 application determines that the type of the network in which the host device lies is IPv6-IPv4 dual stack network and the type of the communication opposite end is an IPv6 communication opposite end, before the IPv4 application generates the IPv4 data packet to be sent to the communication opposite end, the host device maps the IPv6 address of the IPv6 communication opposite end into an IPv4 address as an IPv4 destination address in the IPv4 packet header of the IPv4 data packet, according to the stored mapping table of the corresponding relationship between IPv4 addresses and IPv6 addresses.

Based on the same technical conception, one embodiment of the invention provides a host device with an IPv4 application, the host device includes:

an IPv4 application module, configured to execute an IPv4 application;

a dynamic loading module, configured to judge the type of a network in which the host device lies, and load a packet header translation module when judging that the type of the network in which the host device lies is an IPv6 network;

the packet header translation module, configured to convert an IPv4 packet header of an IPv4 data packet, generated by the IPv4 application and to be sent to a communication opposite end, into an IPv6 packet header; and an interface module, configured to send the data packet converted by the packet header translation module via the IPv6 network.

Figure 3:
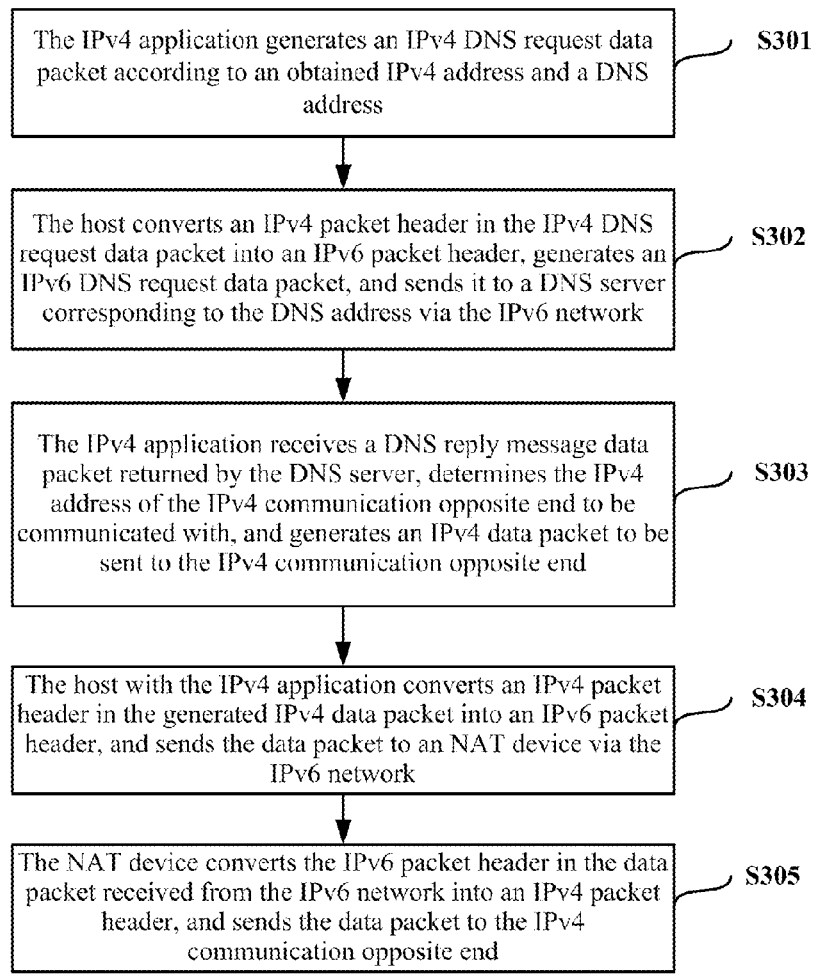
FIG. 3 is a process flowchart 1 of a method for communication for a host device with an IPv4 application according to one embodiment of the invention.

FIG. 3 is a flow chart showing a method for a host device with an IPv4 application to obtain an IPv4 address of a communication opposite end and carry out data communication via an IPv6 network according to one embodiment of the invention, and the method includes the following steps.

Step S301: The IPv4 application generates an IPv4 DNS request data packet according to an obtained IPv4 address and a DNS address.

Step S302: The host device converts an IPv4 packet header in the IPv4 DNS request data packet into an IPv6 packet header, generates a DNS request data packet carried by IPv6, and sends it to a DNS server corresponding to the DNS address via the IPv6 network.

Step S303: The IPv4 application receives a DNS response message data packet returned by the DNS server, and determines the IPv4 address of the IPv4 communication opposite end to be communicated with.

Step S304: The host device converts an IPv4 packet header in a generated IPv4 data packet into an IPv6 packet header, and sends the data packet to a network address translation (NAT) device via the IPv6 network.

Step S305: The NAT device converts the IPv6 packet header in the data packet received from the IPv6 network into an IPv4 packet header, and sends the data packet to the IPv4 communication opposite end.

In another embodiment, when the host device with the IPv4 application has learned the IPv4 address of the communication opposite end, the host device directly generates the IPv4 data packet to be sent to the IPv4 communication opposite end, and then the above Step S304 and Step S305 are executed, thereby realizing the data communication with the IPv4 communication opposite end.

In order to realize the communication between a host device with an IPv4 application and an IPv4 communication opposite end, as an example, one specific signaling interaction process for the above method according to the embodiment of the invention may be realized by employing the following Scheme 1.

Scheme 1: An IPv4 packet header is converted into an IPv6 packet header by newly adding a packet header translation module and an address translation module on the host device, where the specific functions thereof are as follows.

The packet header translation module (Header Translation) mainly accomplishes the conversion of an IPv4 packet header generated by an IPv4 application into an IPv6 packet header. After the packet header translation module receives an IPv4 data packet sent by the IPv4 application, it translates the source IPv4 address and the destination IPv4 address of the data packet into IPv6 addresses, thereby realizing the conversion of IPv4 packet header to IPv6 packet header. During the translation process, the translation methods for the source address and the destination address are different. Where the IPv6 source address is formed by combining the IPv6 prefix allocated by the operator network and the IPv4 source address, while the IPv6 destination address is formed by combining a well-known prefix (WKP) set in the embodiment of the invention and the IPv4 destination address. By the above processing, the IPv4 packet header in the original data packet is replaced by the IPv6 packet header. During the packet header conversion process, the transmission layer and data part of the data packet, except for the ICMP packet, are kept unchanged.

Figure 4:
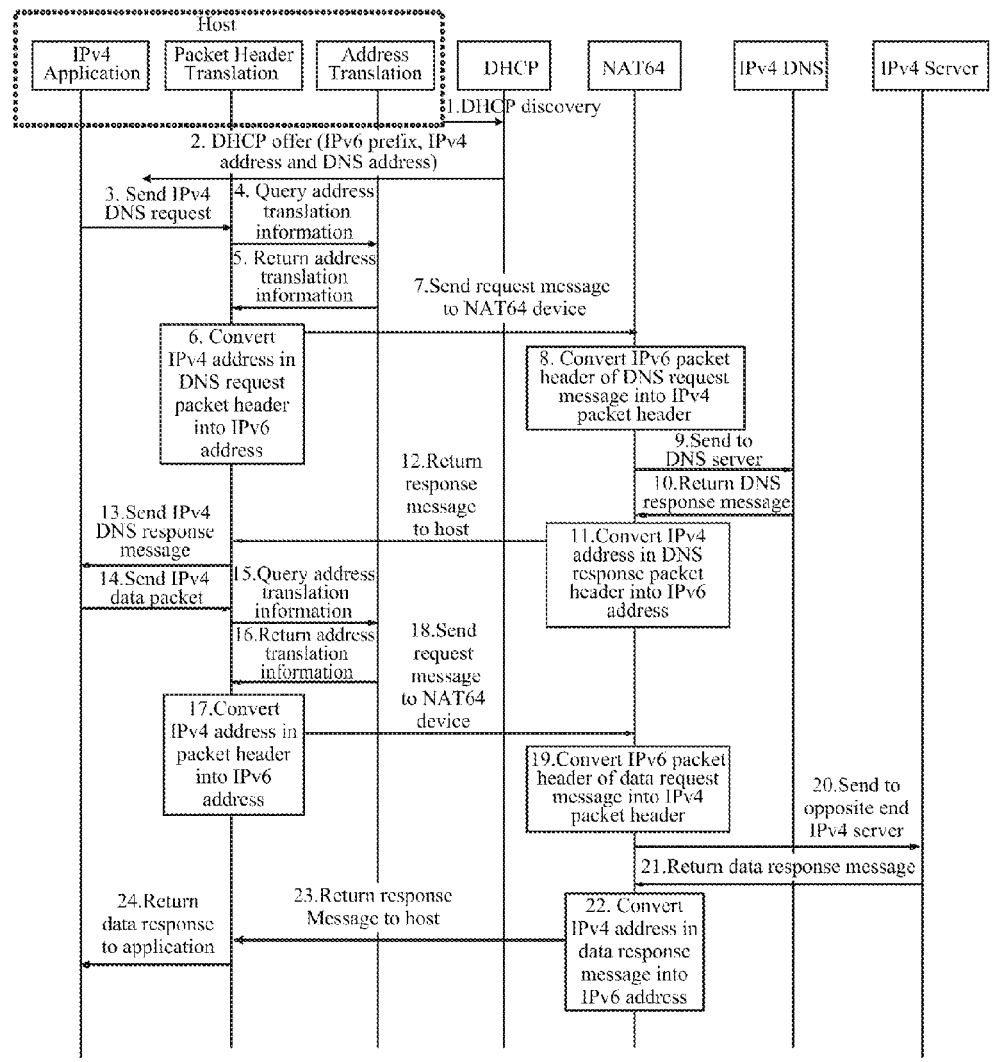
FIG. 4 is a schematic flowchart of signaling interaction corresponding to Scheme 1 according to one embodiment of the invention.

The address translation module (Address Translation), when the packet header translation module executes an address translation from the IPv4 packet header to the IPv6 packet header, maintains prefix information needed in the mapping process from the IPv4 address to the IPv6 address and provides a translation rule for the packet header translation module. Specifically, two types of prefix information are saved by the address translation module, i.e., the IPv6 prefix allocated by the operator and the well-known prefix (WKP) set by the embodiment of the invention, which are used to translate the source address and the destination address respectively. For the source address, the address translation module adds the IPv6 prefix allocated by the operator to form an IPv6 source address; but for the destination address, a WKP is added to form an IPv6 destination address. In conjunction with the above modification on the host device, the host device obtains an address allocated via a Dynamic Host Configuration Protocol (DHCP) server in the IPv6 network, then sends a DNS request for the communication opposite end and communicates the related data stream according to the opposite end address replied by the DNS. The specific flow is as shown in FIG. 4, which includes the following steps.

1) Before communication, the host device requests the DHCP Server to allocate an address, and sends a DHCP discovery message.

Figure 5:
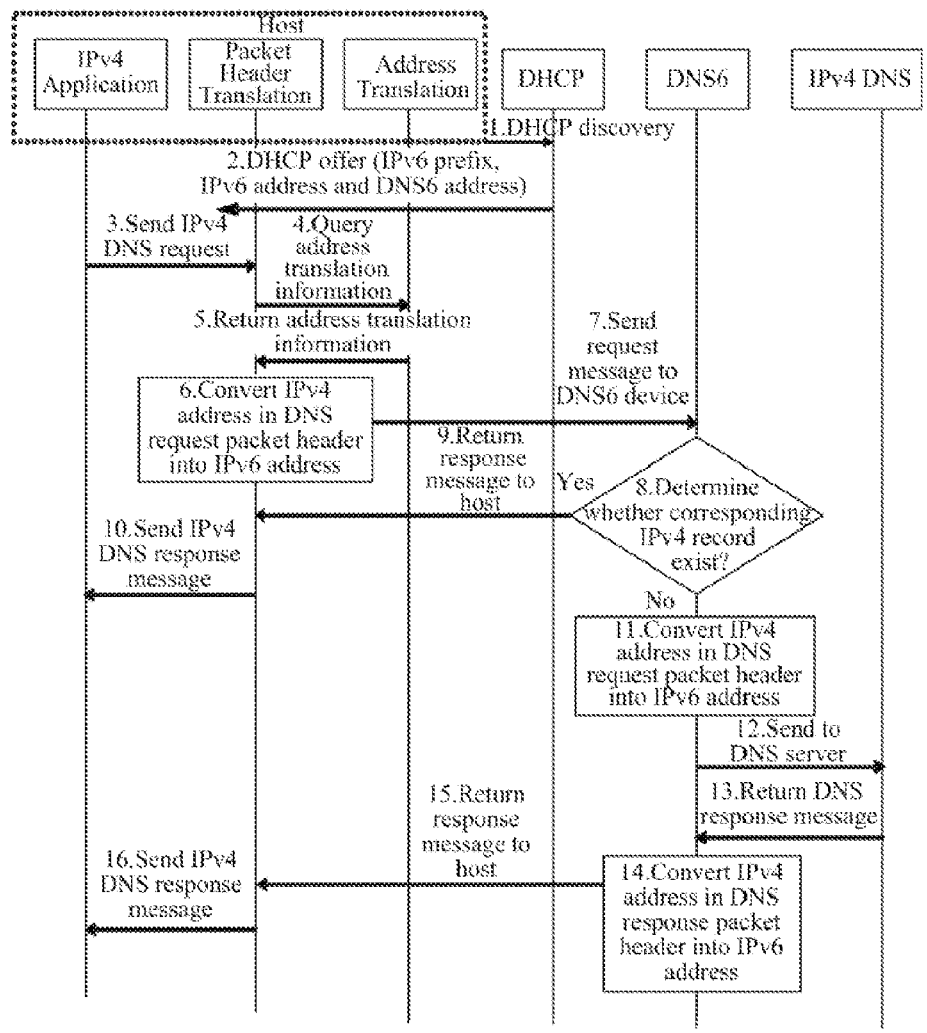
FIG. 5 is a partial schematic flowchart of signaling interaction corresponding to Scheme 1 according to one embodiment of the invention.

2) The DHCP Server responds to the request message, and allocates an IPv6 prefix, an IPv4 address and a domain name system (DNS) server address to the host device; the IPv4 address may be a public address or a private address; the returned DNS Server address may be an IPv4 address, or an IPv6 address of a DNS device located in the IPv6 network. When the returned DNS Server address is an IPv4 address, related DHCP extension needs to be performed. FIG. 4 illustrates a flow when the returned address is an IPv4 address. When the returned address is an IPv6 address of a DNS64, the related processing procedure is as shown in FIG. 5 below.

3) The IPv4 application in the host device initiates an IPv4 DNS request according to the obtained IPv4 address, where the request message is captured by the packet header translation module before it is sent to the IPv6 network, and the address information of the packet header is converted.

4) The packet header translation module sends source address information and destination address information in the IPv4 data packet to the address translation module for processing.

5) For the destination address, the address translation module adds the WKP to form an IPv6 destination address; for the source address, the address translation module adds the IPv6 prefix allocated by the DHCP to the host device to form an IPv6 source address. After the above translation, the address translation module returns the IPv6 address header information to the packet header translation module.

6/7): The packet header translation module sends the corresponding data packet of the DNS request message to a network address translation NAT64 device (in the embodiment of the invention, the NAT64 device is an example of the network address translation device) according to the obtained IPv6 header information.

8) After the NAT64 device receives the DNS request message data packet, it accomplishes the conversion from the IPv6 packet header to the IPv4 packet header. During the conversion process, if the IPv4 address used by the IPv4 application is a private address, the translation process of the NAT64 is a stateful translation, and it needs to map the resource IPv6 address into a public IPv4 address, while the WKP needs to be removed from the destination IPv6 address; if the IPv4 address used by the IPv4 application is a public address, the translation process of the NAT64 is a stateless translation process, and it only needs to remove the corresponding prefix when processing the source address and the destination address. The conversion from the IPv6 packet header to the IPv4 packet header is accomplished in the above process.

9) The NAT64 device sends the request message data packet to an IPv4 DNS Server.

10) The IPv4 DNS Server returns an IPv4 address of the communication opposite end (taking the address of the IPv4 Server as an example) to the NAT64 device.

11) The NAT64 device processes the DNS response message, adds the corresponding prefixes to the source address and the destination address respectively, and accomplishes the stateless conversion from the IPv4 packet header to the IPv6 packet header. If the IPv4 application uses a private address, it further needs to find the corresponding IPv6 source address information according to the mapping state information stored on the NAT64 device.

12) The NAT64 device sends the DNS response data packet to the host device.

13) After the host device receives the DNS response message, it returns the DNS response message to the IPv4 application.

14) The host device initiates an application data request according to the obtained IPv4 address of the communication opposite end, where the application request message is captured by the packet header translation module before it is sent to the IPv6 network, and the address information of the packet header is converted.

15) The packet header translation module sends the source address information and the destination address information in the IPv4 data packet to the address translation module for processing.

16) For the destination address, the address translation module adds the WKP to form an IPv6 destination address; for the source address, the address translation module adds the IPv6 prefix allocated by the DHCP to the host device to form an IPv6 source address. After the above translation, the address translation module returns the related IPv6 address header information to the packet header translation module.

17/18) The packet header translation module sends a data request data packet to the NAT64 device according to the obtained IPv6 header information.

19) After the NAT64 device receives the data request message data packet, it accomplishes the conversion from the IPv6 packet header to the IPv4 packet header. During the conversion process, if the IPv4 address used by the IPv4 application is a private address, the translation process of the NAT64 is a stateful translation, and it needs to map the resource IPv6 address into a public IPv4 address, while the WKP needs to be removed from the destination IPv6 address, and the related application layer gateway (ALG) processing is performed. If the IPv4 address used by the IPv4 application is a public address, the translation process of the NAT64 device is a stateless translation process, it only needs to remove the corresponding IPv6 prefixes when processing the source address and the destination address, and no ALG processing is needed. The conversion from the IPv6 packet header to the IPv4 packet header is accomplished in the above process.

20) The NAT64 device sends the request message to the communication opposite end, i.e., the IPv4 application server.

21) The IPv4 application server returns a response message to the NAT64 device.

22) The NAT64 device processes the response message returned by the IPv4 server, adds the corresponding prefixes to the source address and the destination address respectively, and accomplishes the stateless conversion from the IPv4 packet header to the IPv6 packet header. If the IPv4 application uses a private address, it further needs to find the corresponding IPv6 address information according to the mapping state information stored on the NAT64 and perform ALG-related processing.

23) The NAT64 device sends the application response data to the host device.

24) The host device receives the application response data and then returns it to the IPv4 application.

When the DHCP Server responds to the request message and allocates an IPv6 prefix, an IPv4 address and a DNS Server address to the host device, if the returned DNS Server address is an IPv6 address of DNS Server, the related processing procedure is as shown in FIG. 5, which includes the following steps.

1) Before communication, the host device requests the DHCP Server to allocate an address, and sends a DHCP discovery message.

2) The DHCP Server responds to the request message and allocates an IPv6 prefix, an IPv4 address and an IPv6 address of a DNS Server to the host device; here, the IPv4 address may be a public address or a private address.

3) The IPv4 application initiates a DNS request according to the obtained IPv4 address, where the request message is captured by the packet header translation module before it is sent to the IPv6 network, and the address information of the packet header is converted.

4) The packet header translation module sends the source address information in the IPv4 data packet to the address translation module for processing.

5) The address translation module adds the IPv6 prefix allocated by the DHCP to the host device to form an IPv6 source address. The destination address is an IPv6 address, and may be directly used. After the above translation, the address translation module sends the IPv6 address header information to the packet header translation module.

6/7) The packet header translation module sends a DNS request data packet to the DNS server located in the IPv6 network (DNS6) according to the obtained IPv6 header information.

8) After the DNS server located in the IPv6 network receives the request message, it queries whether the corresponding IPv4 address record of the communication opposite end is stored.

9) When the corresponding IPv4 address record of the communication opposite end is stored on the DNS server located in the IPv6 network, the DNS server located in the IPv6 network directly sends the DNS response data packet to the host device.

10) After the host device receives the DNS response message, it returns the DNS response message to the IPv4 application.

11) When no corresponding IPv4 address record is stored on the DNS Server located in the IPv6 network, the DNS Server located in the IPv6 network forwards the related DNS request to the IPv4 DNS server and converts the IPv6 address in the DNS request message into an IPv4 address.

12) The DNS Server located in the IPv6 network sends the related DNS request to the IPv4 DNS server.

13) The IPv4 DNS server returns a DNS response message.

14) After the DNS Server located in the IPv6 network receives the response message from the related IPv4 DNS server, it converts the IPv4 packet header thereof into an IPv6 packet header.

15) The DNS Server located in the IPv6 network sends the DNS response message data packet to the host device.

16) After the host device receives the DNS response message, it returns the DNS response message to the IPv4 application.

After the IPv4 application determines the IPv4 address of the communication opposite end according to the received DNS response message, the process of data packet delivery with the communication opposite end is the same as Steps 14-24 in FIG. 4, and the description thereof is omitted.

Figure 6:
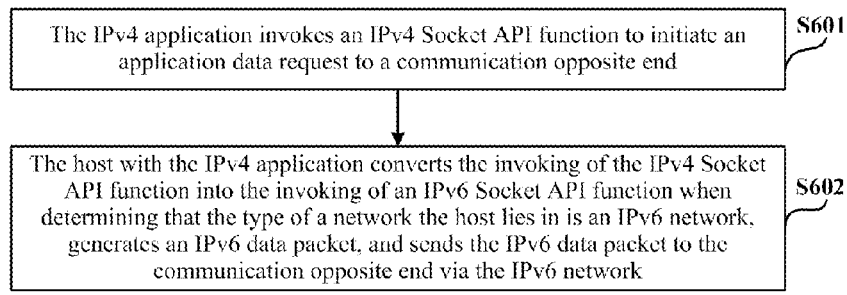
FIG. 6 is a flow chart of another method for data communication for a host device with an IPv4 application according to one embodiment of the invention.

As shown in FIG. 6, one embodiment of the invention provides another method for data communication for a host device with an IPv4 application, the method includes the following steps.

S601: The IPv4 application invokes an IPv4 Socket API function to initiate an application data request to a communication opposite end.

S602: The host device with the IPv4 application converts the invoking of the IPv4 Socket API function into the invoking of an IPv6 Socket API function when determining that the type of a network the host device lies in is an IPv6 network, generates an IPv6 data packet, and sends the IPv6 data packet to the communication opposite end via the IPv6 network.

Specifically, the host device employs Socket translation method: after the host device converts the IPv4 Socket API function for packaging a data packet into an IPv6 Socket API function and converts the parameters of the IPv4 Socket API function into the parameters of the IPv6 Socket API function, it packages the information sent by the IPv4 application into an IPv6 data packet by invoking the IPv6 Socket API function.

During a specific implementation, the step of sending the IPv6 data packet to the communication opposite end via the IPv6 network includes:

the host device sends the IPv6 data packet to an NAT device via the IPv6 network when determining that the communication opposite end is an IPv4 communication opposite end; and the NAT device converts an IPv6 packet header of the received IPv6 data packet into an IPv4 packet header, and forwards the data packet to the IPv4 communication opposite end.

Based on the same technical conception, one embodiment of the invention further provides a host device with an IPv4 application, including:

an IPv4 application module, configured to execute an IPv4 application;

a dynamic loading module, configured to judge the type of a network in which the host device lies, and load a Socket translation module when judging that the type of the network in which the host device lies is an IPv6 network;

the Socket translation module, configured to convert the invoking of an IPv4 Socket API function into the invoking of an IPv6 Socket API function and generate an IPv6 data packet, when the IPv4 application module executes the IPv4 application and invokes the IPv4 Socket API function to initiate an application data request to a communication opposite end; and an interface module, configured to send the IPv6 data packet generated by the Socket translation module via the IPv6 network.

Figure 7:
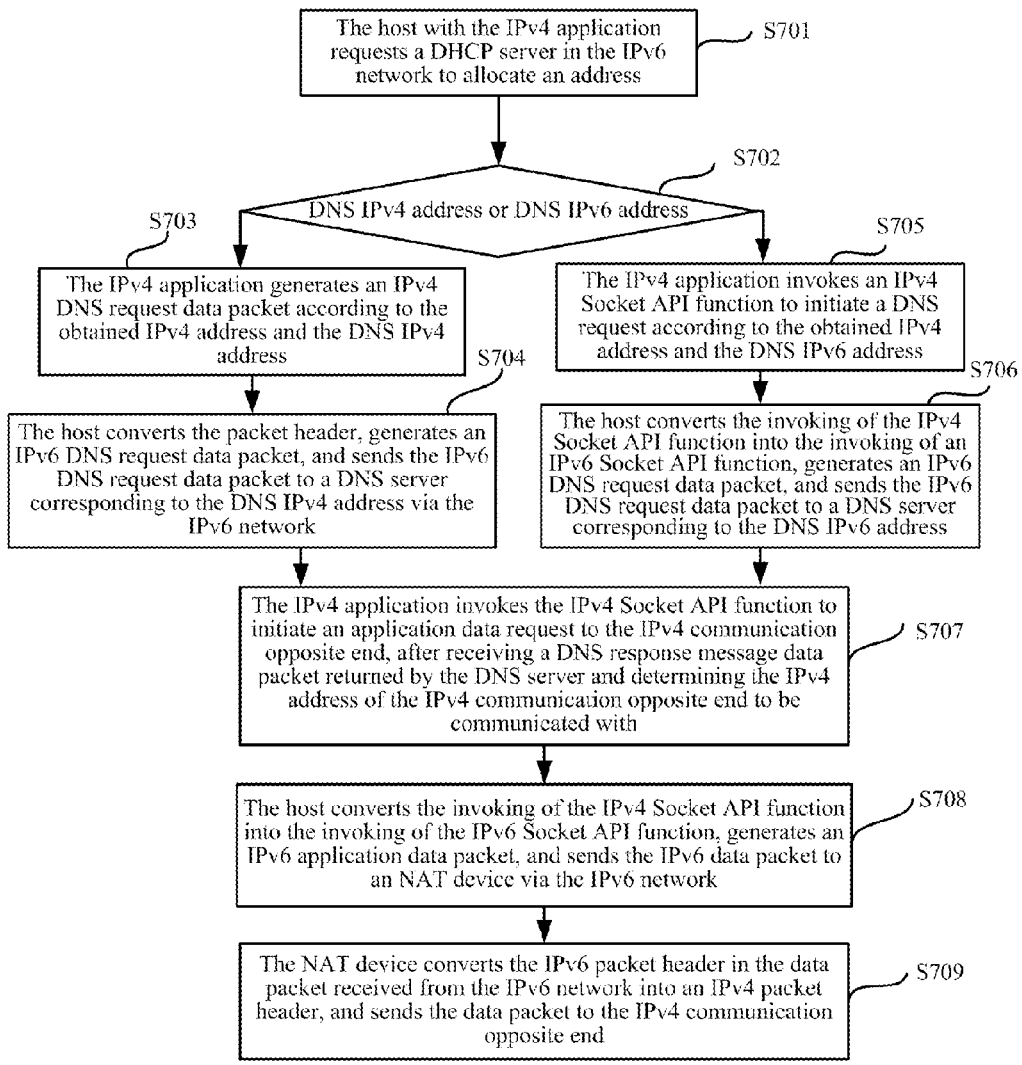
FIG. 7 is a process flowchart 2 of a method for communication for a host device with an IPv4 application according to one embodiment of the invention.

FIG. 7 is a flow chart showing another method for a host device with an IPv4 application to obtain an IPv4 address of a communication opposite end and carry out data communication via an IPv6 network according to one embodiment of the invention, and the method includes the following steps.

Step S701: The host device with the IPv4 application requests a DHCP server in the IPv6 network to allocate an address.

Step S702: The host device judges whether the DNS response returned by the DHCP server conveys an IPv4 record or an IPv6 record; when the obtained DNS response conveys an IPv4 record, the flow turns to Step S703; and when the obtained DNS response conveys an IPv6 record, the flow turns to Step S705.

Step S703: The IPv4 application generates an IPv4 DNS request data packet according to the obtained IPv4 address and the DNS IPv4 address.

Step S704: The host device converts an IPv4 packet header in the IPv4 DNS request data packet into an IPv6 packet header, generates a DNS request data packet carried by IPv6, and sends the DNS request data packet carried by IPv6 to a DNS server corresponding to the DNS IPv4 address via the IPv6 network; then the flow turns to Step S707.

Step S705: The IPv4 application invokes an IPv4 Socket API function to initiate a DNS request according to the obtained IPv4 address and the DNS IPv6 address.

Step S706: The host device converts the invoking of the IPv4 Socket API function into the invoking of an IPv6 Socket API function, generates a DNS request data packet carried by IPv6, and sends the DNS request data packet carried by IPv6 to a DNS server corresponding to the DNS IPv6 address.

Step S707: The IPv4 application invokes the IPv4 Socket API function to initiate an application data request to the IPv4 communication opposite end, after receiving a DNS response message data packet returned by the DNS server and determining the IPv4 address of the IPv4 communication opposite end to be communicated with.

Step S708: The host device converts the invoking of the IPv4 Socket API function into the invoking of the IPv6 Socket API function, generates an IPv6 data packet, and sends the IPv6 data packet to an NAT device via the IPv6 network.

Step S709: The NAT device converts the IPv6 packet header in the data packet received from the IPv6 network into an IPv4 packet header, and sends the data packet to the IPv4 communication opposite end in the IPv4 network.

In another embodiment, when the host device with the IPv4 application has learned the IPv4 address of the IPv4 communication opposite end, it directly generates an IPv4 data packet to be sent to the IPv4 communication opposite end, and then the above Step S705 to Step S709 are executed, thereby realizing the data communication with the IPv4 communication opposite end.

In order to realize the communication between a host device with an IPv4 application and an IPv4 communication opposite end, as an example, one specific signaling interaction process for the above method according to the embodiment of the invention may be realized by employing the following Scheme 2.

Scheme 2: A DNS judging and processing module, a Socket translation module, a packet header translation module and an address translation module are newly added to the host device.

The DNS judging and processing module is configured to judge whether a received DNS response is an IPv4 record or a IPv6 record; when it is a IPv4 record, the packet header translation module is started; and when it is a IPv6 record, the Socket translation module is started.

The Socket translation module is configured to realize the mutual translation between an IPv4 Socket API function and an IPv6 Socket API function. When a Socket function invoking initiated by an IPv4 application is detected, the function invoking may be intercepted and replaced by an IPv6 API function corresponding to the IPv4 API function. During the conversion process, a conversion from IPv4 parameters to IPv6 parameters may also be carried out on the related API input parameters.

The packet header translation module (Header Translation) mainly accomplishes the conversion from an IPv4 packet header of an IPv4 DNS request message generated by the IPv4 application to an IPv6 packet header. After the packet header translation module receives the DNS request message initiated by the IPv4 application, it translates a source IPv4 address and a destination IPv4 address of the data packet into IPv6 addresses, thereby realizing the conversion of IPv4 packet header to IPv6 packet header. During the translation process, the translation methods for the source address and the destination address are different. Where the IPv6 source address is formed by combining an IPv6 prefix allocated by the operator network and the IPv4 source address, while the IPv6 destination address is formed by combining the well-known prefix (WKP) set in the embodiment of the invention and the destination IPv4 address. By the above processing, the IPv4 packet header in the original data packet is replaced by an IPv6 packet header. During the packet header conversion process, the data part of the DNS request is kept unchanged.

The address translation module (Address Translation), when the Socket translation module needs to carry out a conversion from IPv4 input parameters to IPv6 input parameters, may maintain prefix information needed in the mapping process from an IPv4 address to an IPv6 address and provide the mapping information to the Socket translation module. Specifically, two types of prefix information may be saved on the address translation module, i.e., the IPv6 prefix allocated by the operator and the well-known prefix (WKP) set in the embodiment of the invention, which are used to translate the source address and the destination address respectively. For the source address, the address translation module may add the IPv6 prefix allocated by the operator to form an IPv6 source address; but for the destination address, the WKP may be added to form an IPv6 destination address.

Figure 8:
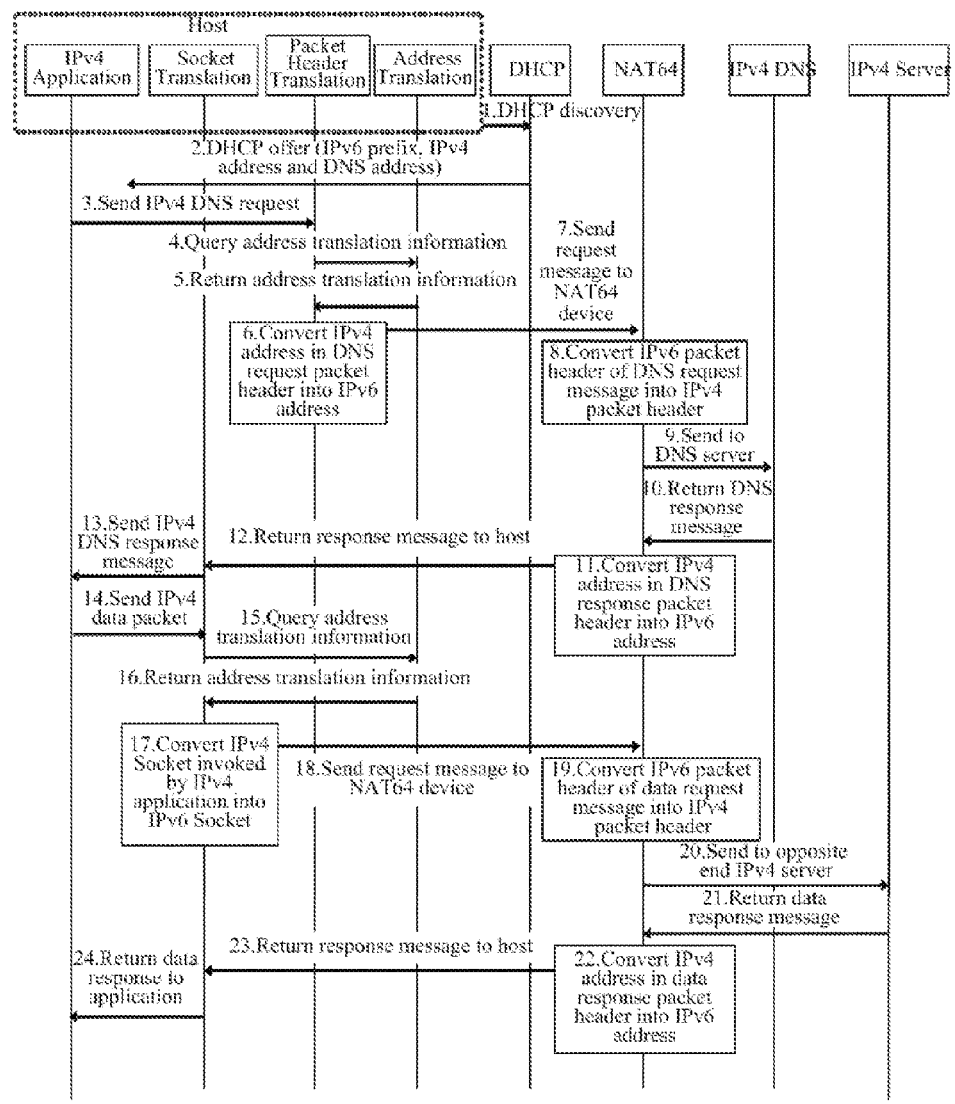
FIG. 8 is a schematic flowchart of signaling interaction corresponding to Scheme 2 according to one embodiment of the invention.

In conjunction with the above modification on the host device, during the implementation of Scheme 2, the host device obtains an address via a DHCP Server, then sends a DNS request for the communication opposite end and communicates the related data stream according to the opposite end address replied by the DNS. The specific flow is as shown in FIG. 8, which includes the following steps.

1) Before communication, the host device requests the DHCP Server to allocate an address, and sends a DHCP discovery message.

Figure 9:
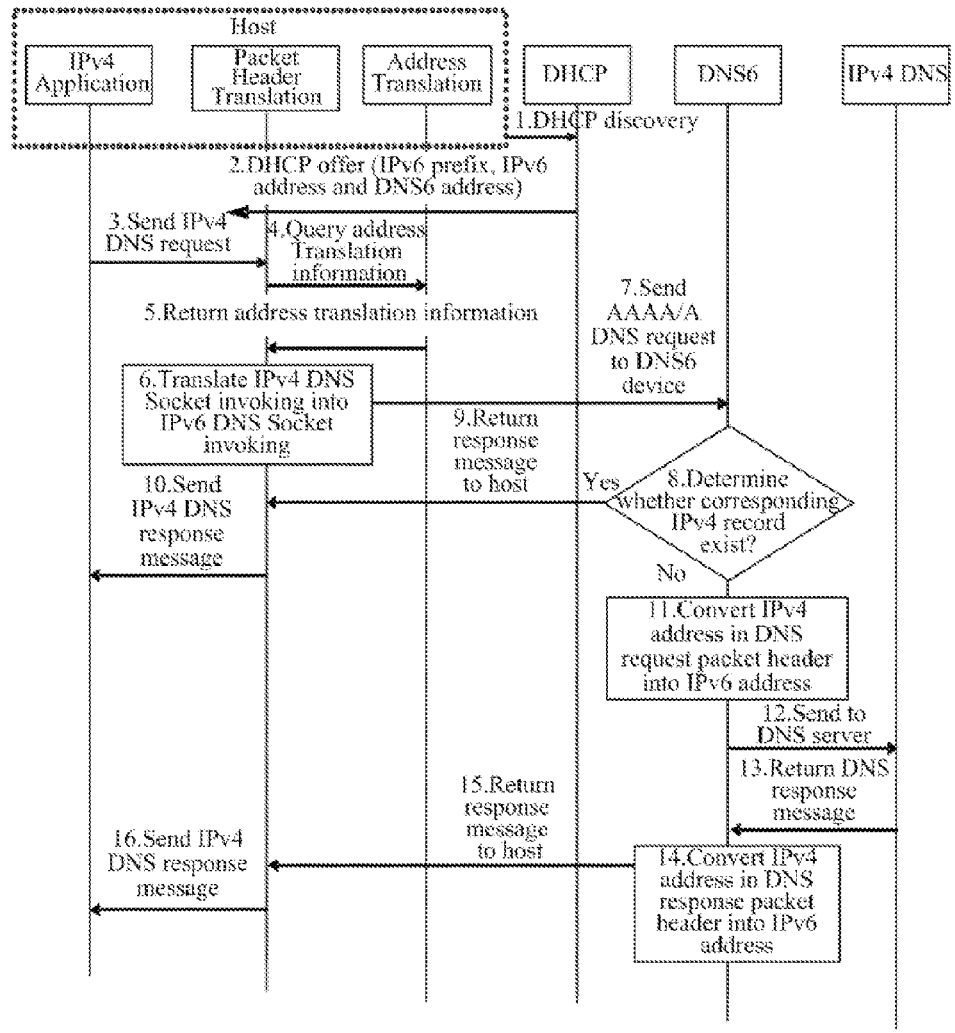
FIG. 9 is a partial schematic flowchart of signaling interaction corresponding to Scheme 2 according to one embodiment of the invention.

2) The DHCP Server responds to the request message and allocates an IPv6 prefix, an IPv4 address and a DNS Server address to the host device; here, the IPv4 address may be a public address or a private address; the returned DNS Server address may be an IPv4 address, or may be an IPv6 address of a DNS device located in the IPv6 network. When the returned DNS Server address is an IPv4 address, related DHCP extension needs to be performed. FIG. 8 illustrates a flow when the returned DNS Server address is an IPv4 DNS server address. When the returned address is an IPv6 address of a DNS64, the related processing procedure is as shown in FIG. 9 below.

3) The IPv4 application in the host device initiates an IPv4 DNS request according to the obtained IPv4 address and the DNS IPv4 address, where the request message may be captured by the packet header translation module before it is sent to the IPv6 network, and the address information of the packet header may be converted.

4) The packet header translation module sends the source address information and the destination address information in the IPv4 data packet to the address translation module for processing.

5) For the destination address, the address translation module adds the WKP to form an IPv6 destination address; for the source address, the address translation module adds the IPv6 prefix allocated by the DHCP to the host device to form an IPv6 source address. After the above translation, the address translation module returns the IPv6 address header information to the packet header translation module.

6/7) The packet header translation module sends the corresponding data packet of the DNS request message to a network address translation NAT64 device according to the obtained IPv6 header information.

8) After the NAT64 device receives the DNS request message, it accomplishes the conversion from the IPv6 packet header to an IPv4 packet header. During the conversion process, if the IPv4 address used by the IPv4 application is a private address, the translation process of the NAT64 device is a stateful translation, and it needs to map the resource IPv6 address into a public IPv4 address, while the WKP needs to be removed from the destination IPv6 address; if the IPv4 address used by the IPv4 application is a public address, the translation process of the NAT64 is a stateless translation process, and it only needs to remove the corresponding prefixes when processing the source address and the destination address. The conversion from the IPv6 packet header to the IPv4 packet header is accomplished in the above process.

9) After packet header conversion, the NAT64 device sends the DNS request message to an IPv4 DNS Server.

10) The DNS Server returns an address of the communication opposite end (for example, an IPv4 Server) to the NAT64 device.

11) The NAT64 processes the DNS response message, adds the corresponding prefixes to the source address and the destination address respectively, and accomplishes the stateless conversion from the IPv4 packet header to the IPv6 packet header. If the IPv4 application uses a private address, it further needs to find the corresponding IPv6 source address information according to the mapping state information stored on the NAT64.

12) The NAT64 device sends the DNS response data packet to the host device.

13) After the host device receives the DNS response message, it sends the DNS response message to the IPv4 application.

14) The IPv4 application in the host device initiates an application data request according to the obtained IPv4 address of the communication opposite end. The Socket translation module may capture the current system invoking and carry out an IPv6 Socket API conversion. The IPv6 parameter information needed by the Socket API function may be obtained by querying the address translation module via the Socket translation module.

15) The Socket translation module sends the source address information and the destination address information in the IPv4 data packet to the address translation module for processing.

16) For the destination address, the address translation module adds the WKP to form an IPv6 destination address; for the source address, the address translation module adds the IPv6 prefix allocated by the DHCP to the host device to form an IPv6 source address. After the above translation, the address translation module sends the related IPv6 address header information to the Socket translation module.

17/18) The Socket translation module invokes an IPv6 Socket API according to the obtained IPv6 header information, and this process realizes the packaging of the IPv4 application request data in an IPv6 data packet, and the original data part is kept unchanged. Subsequently, the host device sends the data packet to the NAT64 device.

19) After the NAT64 device receives the data request message, it accomplishes the conversion from an IPv6 packet header to an IPv4 packet header. During the conversion process, if the IPv4 address used by the IPv4 application is a private address, the translation process of the NAT64 is a stateful translation, and it needs to map the resource IPv6 address into a public IPv4 address, while the WKP needs to be removed from the destination IPv6 address, and the related ALG processing is performed. If the IPv4 address used by the IPv4 application is a public address, the translation process of the NAT64 is a stateless translation process, it only needs to remove the corresponding prefixes when processing the source address and the destination address, and no ALG processing is needed. The conversion from the IPv6 packet header to the IPv4 packet header is accomplished in the above process.

20) The NAT64 device sends the application request message to the IPv4 application server of the communication opposite end.

21) The IPv4 application server returns a response message to the NAT64 device.

22) The NAT64 device processes the returned response message, adds the corresponding IPv6 prefixes to the source address and the destination address respectively, and accomplishes the stateless conversion from an IPv4 packet header to an IPv6 packet header. If the IPv4 application uses a private address, it further needs to find the corresponding IPv6 address information according to the mapping state information stored on the NAT64 and perform ALG-related processing.

23) The NAT64 device sends application response data to the host device.

24) After the host device receives the application response message, it sends the application response message to the IPv4 application.

When the DHCP Server responds to the request message and allocates an IPv6 prefix, an IPv4 address and a DNS Server address to the host device with an IPv4 application, if the returned DNS Server address is an IPv6 address of DNS server, the related processing procedure is as shown in FIG. 9, which includes the following steps.

1) Before communication, the host device requests the DHCP Server to allocate an address, and sends a DHCP discovery message.

2) The DHCP Server responds to the request message and allocates an IPv6 prefix, an IPv4 address and an address of a DNS Server located in the IPv6 network to the host device; here, the IPv4 address may be a public address or a private address.

3) The IPv4 application initiates a DNS request according to the obtained IPv4 address, where the DNS request is initiated by invoking IPv4 Socket API-gethostbyname( ). The Socket translation module may capture the current system invoking, carry out the conversion to IPv6 Socket, and use the corresponding API-getaddrinfo ( ) to form the corresponding DNS request. The IPv6 parameter information needed by the related API may be obtained by querying the address translation module via the Socket translation module.

4) The Socket translation module sends the source address information in the invoked IPv4 Socket API function to the address translation module for processing.

5) The address translation module adds an IPv6 prefix allocated by the DHCP to the host device to form an IPv6 source address. The destination address is an IPv6 address, and may be directly used. After the above translation, the address translation module sends the IPv6 address header information to the Socket translation module.

6/7) The Socket translation module invokes an IPv6 Socket API according to the obtained IPv6 header information, forms a DNS request message, and sends it to the DNS6 device.

8) After the DNS server located in the IPv6 network receives the request message, it queries whether the corresponding IPv4 address record of the communication opposite end is stored locally.

9) When the corresponding IPv4 address record of the communication opposite end is stored on the DNS server located in the IPv6 network, the DNS server located in the IPv6 network directly sends the DNS response data packet to the host device.

10) After the host device receives the DNS response message data, it returns the DNS response message data to the IPv4 application.

11) When no corresponding IPv4 address record of the communication opposite end is stored on the DNS server located in the IPv6 network, the DNS server located in the IPv6 network may forward the related DNS request to a DNS server located in the IPv4 network (DNS4) and convert the IPv6 address in the DNS request message into an IPv4 address.

12) The DNS server located in the IPv6 network sends the related DNS request to the DNS server located in the IPv4 network.

13) The DNS server located in the IPv4 network returns a DNS response message.

14) After the DNS server located in the IPv6 network receives the response message from the related DNS server located in the IPv4 network, it converts the IPv4 packet header thereof into an IPv6 packet header.

15) The DNS server located in the IPv6 network sends the DNS response data to the host device.

16) After the host device receives the DNS response message, it returns the DNS response message to the IPv4 application.

After the IPv4 application determines the IPv4 address of the communication opposite end according to the received DNS response message, the process of data packet delivery with the communication opposite end may be the same as steps 14-24 in FIG. 8, so the description thereof is omitted.

Figure 10:
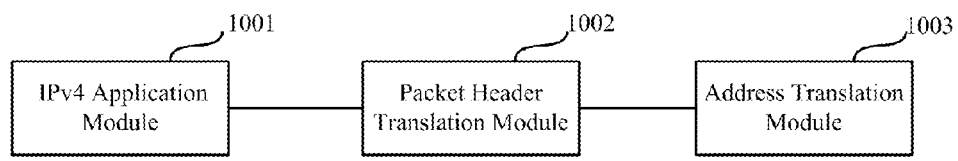
FIG. 10 is a structural diagram 1 of a host device with an IPv4 application according to one embodiment of the invention.

A structural diagram of a host device with an IPv4 application corresponding to the above Scheme 1 is as shown in FIG. 10, the host device includes:

an IPv4 application module 1001, configured to execute an IPv4 application;

a packet header translation module 1002, configured to convert an IPv4 packet header in an IPv4 data packet sent by the IPv4 application module 1001 into an IPv6 packet header; and an address translation module 1003, configured to provide a mapping between an IPv4 address and an IPv6 address.

Where the packet header translation module 1002 is configured to capture the IPv4 packet header in the IPv4 data packet, send an IPv4 source address and an IPv4 destination address in the IPv4 packet header to the address translation module 1003, receive an IPv6 source address and an IPv6 destination address returned by the address translation module 1003 and form the IPv6 packet header.

The address translation module 1003 is configured to receive the IPv4 source address and the IPv4 destination address sent by the packet header translation module 1002, combine the IPv4 source address with an IPv6 prefix allocated to the host device and generate an IPv6 source address, and combine the IPv4 destination address with a stored well-known prefix and generate an IPv6 destination address, and return the IPv6 source address and the IPv6 destination address to the packet header translation module 1002.

Figure 11:
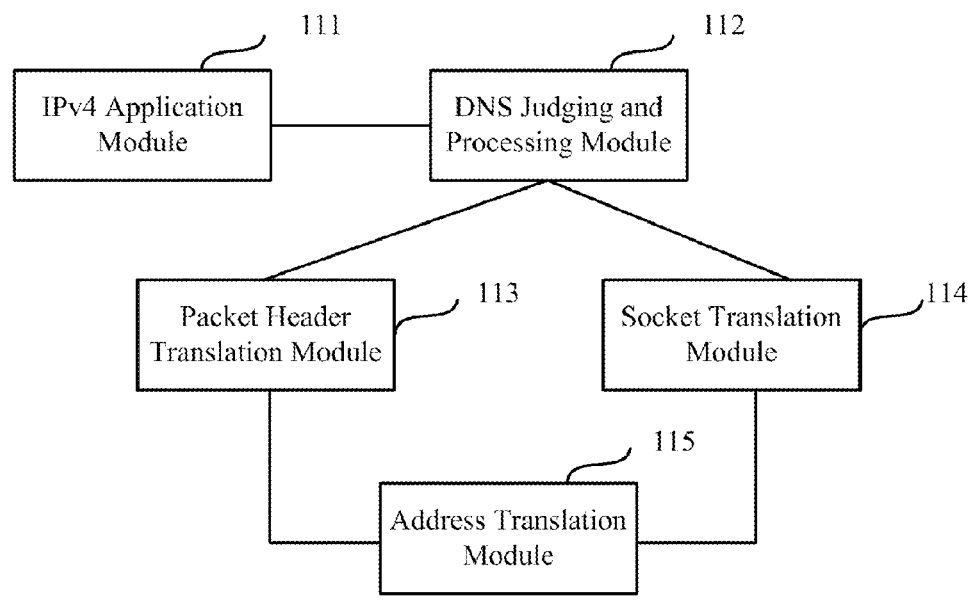
FIG. 11 is a structural diagram 2 of the host device with an IPv4 application according to one embodiment of the invention.

A structural diagram of a host device corresponding to the above Scheme 2 is as shown in FIG. 11, the host device includes:

an IPv4 application module 111, configured to execute an IPv4 application;

a DNS judging and processing module 112, configured to judge whether the received DNS response conveys an IPv4 record or an IPv6 record; when it is an IPv4 record, a packet header translation module is started; and when it is an IPv6 record, a Socket translation module is started;

a packet header translation module 113, configured to convert an IPv4 packet header in an IPv4 data packet sent by the IPv4 application module into an IPv6 packet header;

a Socket translation module 114, configured to convert the invoking of an IPv4 Socket API function into the invoking of an IPv6 Socket API function, when the IPv4 application module 111 executes an IPv4-related application to invoke the IPv4 Socket API function; and an address translation module 115, configured to provide a mapping between an IPv4 address and an IPv6 address.

Where the packet header translation module 113 is configured to capture the IPv4 packet header in the IPv4 data packet, and send an IPv4 source address and an IPv4 destination address in the IPv4 packet header to the address translation module 115, receive an IPv6 source address and an IPv6 destination address returned by the address translation module 115, and form the IPv6 packet header.

The Socket translation module 114 is configured to capture the invoking of the IPv4 Socket API function, send an IPv4 source address and an IPv4 destination address in the invoked IPv4 Socket API function to the address translation module 115, receive an IPv6 source address and an IPv6 destination address returned by the address translation module 115, and convert into the invoking of the IPv6 Socket API function.

The address translation module 115 is configured to receive the IPv4 source address and the IPv4 destination address sent by the Socket translation module 114, combine the IPv4 source address with an IPv6 prefix allocated to the host device and generate an IPv6 source address, and combine the IPv4 destination address with a stored well-known prefix and generate an IPv6 destination address, and return the IPv6 source address and the IPv6 destination address to the Socket translation module 114.

In conclusion, by the invention, at the same time an IPv6 system is deployed, the normal communication of a traditional IPv4 application may be guaranteed, and it is made transparent and imperceptible for the application, thereby realizing an IPv6 transition technology that has a backward compatibility with the IPv4.

During the communication process of a host device with an IPv4 application via an IPv6 network, a two-way stateless address translation process may be realized, the data packet processing load of a border NAT gateway may be lowered, and the extensibility of system deployment may be further improved.

Different prefixes are allocated to the source address and the destination address, so that the routability and accessibility of application data may be guaranteed, and at the same time, the polymerizability of prefix in the original routing system will not be destroyed.

Those skilled in the art may understand that all or a part of the steps for realizing the method of the above embodiments may be accomplished by instructing related hardware via a program, and the program may be stored in a computer-readable storage medium, for example, a ROM/RAM, a diskette and a compact disc.

It may also be understood that the device structures shown in the drawings or the embodiments are illustrative only and represent logic structures. Where a module shown as a separated part may or may not be physically separated, and a component shown as a module may or may not be a physical module.

The above description only illustrates preferred embodiments of the invention. It should be noted that various modifications and variations can be made by those skilled in the art without departing from the spirit and scope of the invention, and all these modifications and variations are intended to be contemplated by the invention.

The invention claimed is:

1. A method for data communication for a host device with an IPv4 application, comprising:
    generating, by the IPv4 application, an IPv4 data packet to be sent to a communication opposite end; and
    converting, by the host device, when determining that the type of a network the host device lies in is an IPv6 network, an IPv4 packet header of the IPv4 data packet into an IPv6 packet header, and sending the converted data packet to the communication opposite end via the IPv6 network,
    wherein, converting the IPv4 packet header of the IPv4 data packet into the IPv6 packet header by the host device comprises:
    combining, by the host device, an IPv4 source address in the IPv4 packet header of the IPv4 data packet with a pre-allocated IPv6 prefix to generate an IPv6 source address in the IPv6 packet header; and
    combining an IPv4 destination address in the IPv4 packet header of the IPv4 data packet with a prestored well-known prefix to generate an IPv6 destination address in the IPv6 packet header.

2. The method according to claim 1, wherein, sending the converted data packet to the communication opposite end via the IPv6 network comprises:
    sending, by the host device, the converted data packet to a network address translation, NAT, device via the IPv6 network, when determining that the type of the communication opposite end is an IPv4 communication opposite end; and
    converting, by the NAT device, the IPv6 packet header of the received data packet into the IPv4 packet header, and forwarding the data packet to the IPv4 communication opposite end.

3. The method according to claim 1, wherein, converting the IPv6 packet header of the received data packet into the IPv4 packet header by the NAT device comprises:
    mapping, by the NAT device, the IPv6 source address in the IPv6 packet header into a public IPv4 address, or removing the IPv6 prefix from the IPv6 source address in the IPv6 packet header; and
    removing the well-known prefix from the IPv6 destination address in the IPv6 packet header.

4. The method according to claim 2, further comprising: after the IPv4 communication opposite end receives the data packet forwarded by the NAT device,
    sending, by the IPv4 communication opposite end, an IPv4 data packet to be returned to the host device to the NAT device;
    converting, by the NAT device, an IPv4 packet header of the IPv4 data packet into an IPv6 packet header, and delivering the data packet to the host device via the IPv6 network; and
    returning, by the host device, the received data packet to the IPv4 application.

5. The method according to claim 4, wherein, converting an IPv4 packet header of the IPv4 data packet into an IPv6 packet header by the NAT device comprises:
    combining, by the NAT device, an IPv4 source address in the IPv4 packet header of the IPv4 data packet with the IPv6 prefix to generate an IPv6 source address in the IPv6 packet header, or, finding an IPv6 source address corresponding to an IPv4 source address in the IPv4 packet header of the IPv4 data packet according to a stored mapping state information; and combining, by the NAT device, an IPv4 destination address in the IPv4 packet header of the IPv4 data packet with the well-known prefix to generate an IPv6 destination address in the IPv6 packet header.

6. The method according to claim 1, further comprising: before generating an IPv4 data packet to be sent to a communication opposite end by the IPv4 application, mapping, by the host device, an IPv6 address of an IPv6 communication opposite end into an IPv4 address as an IPv4 destination address in an IPv4 packet header of the IPv4 data packet according to a stored mapping table of a corresponding relationship between IPv4 addresses and IPv6 addresses, when determining that the type of the communication opposite end is the IPv6 communication opposite end.

7. The method according to claim 1, further comprising:

mapping, by the host device, an IPv6 address of an IPv6 communication opposite end into an IPv4 address as an IPv4 destination address in an IPv4 packet header of the IPv4 data packet according to a stored mapping table of a corresponding relationship between IPv4 addresses and IPv6 addresses, when determining that the type of a network in which the host device lies is an IPv6-IPv4 dual stack network and the type of the communication opposite end is the IPv6 communication opposite end and before generating an IPv4 data packet to be sent to a communication opposite end by the IPv4 application.

8. A method for data communication for a host device with an IPv4 application, comprising:

invoking, by the IPv4 application, an IPv4 Socket API function to initiate an application data request to a communication opposite end; and converting, by the host device, the invoking of the IPv4 Socket API function into the invoking of an IPv6 Socket API function when determining that the type of a network the host device lies in is an IPv6 network, generating an IPv6 data packet, and sending the IPv6 data packet to the communication opposite end via the IPv6 network, wherein, converting the invoking of the IPv4 Socket API function into the invoking of the IPv6 Socket API function by the host device and generating the IPv6 data packet comprises:

combining, by the host device, an IPv4 source address in the invoked IPv4 Socket API function with a pre-allocated IPv6 prefix to generate an IPv6 source address;

combining, by the host device, an IPv4 destination address in the invoked IPv4 Socket API function with a prestored well-known prefix to generate an IPv6 destination address; and converting, by the host device, the invoking of the IPv4 Socket API function into the invoking of the IPv6 Socket API function according to the generated IPv6 source address and the IPv6 destination address to generate an IPv6 data packet.

9. The method according to claim 8, wherein, sending the IPv6 data packet to the communication opposite end via the IPv6 network comprises:

sending, by the host device, the IPv6 data packet to a network address translation, NAT, device via the IPv6 network when determining that the communication opposite end is an IPv4 communication opposite end; and converting, by the NAT device, an IPv6 packet header of the received IPv6 data packet into an IPv4 packet header, and forwarding the data packet to the IPv4 communication opposite end.

10. The method according to claim 8, wherein, converting an IPv6 packet header of the received IPv6 data packet into an IPv4 packet header by the NAT device comprises:

mapping, by the NAT device, the IPv6 source address in the IPv6 packet header into a public IPv4 address, or, removing the IPv6 prefix from the IPv6 source address in the IPv6 packet header; and removing the well-known prefix from the IPv6 destination address in the IPv6 packet header.

11. The method according to claim 9, further comprising: after the IPv4 communication opposite end receives the data packet forwarded by the NAT device, sending, by the IPv4 communication opposite end, an IPv4 data packet to be returned to the host device to the NAT device;

converting, by the NAT device, an IPv4 packet header of the IPv4 data packet into an IPv6 packet header, and delivering the data packet to the host device via the IPv6 network; and returning, by the host device, the received data packet to the IPv4 application.

12. The method according to claim 11, wherein, converting an IPv4 packet header of the IPv4 data packet into an IPv6 packet header by the NAT device comprises:

combining, by the NAT device, an IPv4 source address in the IPv4 packet header of the IPv4 data packet with the IPv6 prefix to generate an IPv6 source address in the IPv6 packet header, or, finding an IPv6 source address corresponding to an IPv4 source address in the IPv4 packet header of the IPv4 data packet according to a stored mapping state information; and combining, by the NAT device, an IPv4 destination address in the IPv4 packet header of the IPv4 data packet with the well-known prefix to generate an IPv6 destination address in the IPv6 packet header.

13. A method for a host device with an IPv4 application to obtain an IPv4 address of a communication opposite end via an IPv6 network, comprising:

generating, by the IPv4 application, an IPv4 DNS request data packet according to an IPv4 address and a domain name system, DNS, address obtained;

converting, by the host device, an IPv4 packet header in the IPv4 DNS request data packet into an IPv6 packet header, generating a DNS request data packet carried by IPv6, and sending the DNS request data packet carried by IPv6 to a DNS server corresponding to the DNS address via the IPv6 network; and receiving, by the IPv4 application, a DNS response message data packet returned by the DNS server, and obtaining the IPv4 address of the IPv4 communication opposite end to be communicated with, wherein, the DHCP server further returns to the host device an IPv6 prefix allocated to the host device; and the host device further stores a well-known prefix;

wherein, when the DNS address is an address of an IPv4 DNS server in an IPv4 network, converting the IPv4 packet header in the IPv4 DNS request data packet into the IPv6 packet header by the host device comprises:

combining, by the host device, an IPv4 source address in the IPv4 packet header of the IPv4 DNS request data packet with the IPv6 prefix to generate an IPv6 source address in the IPv6 packet header; and combining, by the host device, an IPv4 destination address in the IPv4 packet header of the IPv4 DNS request data packet with the well-known prefix to generate an IPv6 destination address in the IPv6 packet header;

wherein, when the DNS address is an address of an IPv6 DNS server in the IPv6 network, converting the IPv4 packet header in the IPv4 DNS request data packet into the IPv6 packet header comprises:

combining, by the host device, an IPv4 source address in the IPv4 packet header of the IPv4 DNS request data packet with the IPv6 prefix to generate an IPv6 source address in the IPv6 packet header; and taking, by the host device, an IPv6 destination address in the IPv4 packet header of the IPv4 DNS request data packet as an IPv6 destination address in the IPv6 packet header.

14. The method according to claim 13, further comprising: before generating an IPv4 DNS request data packet by the IPv4 application, requesting, by the host device, a dynamic host configuration protocol, DHCP, server to allocate an address; and returning, by the DHCP server, the allocated IPv4 address and the DNS address to the host device.

15. The method according to claim 13, wherein, when the DNS address is the address of the IPv4 DNS server in the IPv4 network, sending the DNS request data packet carried by IPv6 to a DNS server corresponding to the DNS address via the IPv6 network comprises:

sending, by the host device, the DNS request data packet carried by IPv6 to an NAT device via the IPv6 network; and converting, by the NAT device, the IPv6 packet header in the DNS request data packet carried by IPv6 into the IPv4 packet header, and delivering the data packet to the IPv4 DNS server;

and wherein before receiving by the IPv4 application a DNS response message data packet returned by the DNS server, the method further comprises:

generating, by the IPv4 DNS server, the IPv4 DNS response message data packet, and returning the IPv4 DNS response message data packet to the NAT device;

converting, by the NAT device, an IPv4 packet header in the IPv4 DNS response message data packet into an IPv6 packet header, generating an IPv6 DNS response message data packet, and sending the IPv6 DNS response message data packet to the host device via the IPv6 network; and returning, by the host device, the IPv6 DNS response message data packet to the IPv4 application.

16. The method according to claim 15, wherein, converting the IPv6 packet header in the DNS request data packet carried by IPv6 into the IPv4 packet header by the NAT device comprises:

mapping, by the NAT device, the IPv6 source address in the IPv6 packet header of the DNS request data packet carried by IPv6 into a public IPv4 address, and removing the well-known prefix from the IPv6 destination address in the IPv6 packet header of the DNS request data packet carried by IPv6; or removing, by the NAT device, the IPv6 prefix from the IPv6 source address in the IPv6 packet header of the DNS request data packet carried by IPv6, and removing the well-known prefix from the IPv6 destination address in the IPv6 packet header of the DNS request data packet carried by IPv6;

wherein converting an IPv4 packet header in the IPv4 DNS response message data packet into an IPv6 packet header by the NAT device comprises:

combining an IPv4 source address in the IPv4 DNS response message data packet with the IPv6 prefix to generate an IPv6 source address in the IPv6 packet header when the IPv4 source address in the IPv4 DNS response message data packet is a public IPv4 address; and combining an IPv4 destination address in the IPv4 DNS response message data packet with the well-known prefix to generate an IPv6 destination address in the IPv6 packet header.

17. The method according to claim 13, wherein, when the DNS address is the address of the IPv6 DNS server in the IPv6 network, the host device directly sends the DNS request data packet carried by IPv6 to the IPv6 DNS server corresponding to the DNS address via the IPv6 network;

before receiving by the IPv4 application a DNS response message data packet returned by the DNS server, the method further comprises:

judging, by the IPv6 DNS server, whether an IPv4 address of the communication opposite end is saved locally according to the received DNS request data packet carried by IPv6, if so, sending an IPv6 DNS response message data packet to the host device directly;

if not, converting the IPv6 packet header in the DNS request data packet carried by IPv6 into the IPv4 packet header by the IPv6 DNS server and sending the data packet to the IPv4 DNS server; and receiving an IPv4 DNS response message data packet returned by the IPv4 DNS server, converting an IPv4 packet header in the IPv4 DNS response message data packet into an IPv6 packet header and sending the data packet to the host device; and returning, by the host device, the IPv6 DNS response message data packet to the IPv4 application.

* * * * *